M. A. SMITH.
COATING MACHINE.
APPLICATION FILED AUG. 6, 1903.

901,749. Patented Oct. 20, 1908.

M. A. SMITH.
COATING MACHINE.
APPLICATION FILED AUG. 6, 1903.

901,749.

Patented Oct. 20, 1908.

WITNESSES:
Sara Schenk
C. A. Pierce

INVENTOR
Myron A. Smith
BY A. M. Pierce
ATTORNEY.

M. A. SMITH.
COATING MACHINE.
APPLICATION FILED AUG. 6, 1903.

No. 901,749.

Patented Oct. 20, 1908.

WITNESSES:
Clara Schenk.
E. A. Pierce.

INVENTOR
Myron A. Smith.
BY A. M. Pierce,
ATTORNEY.

THE NORRIS PETERS CO., WASHINGTON, D. C.

UNITED STATES PATENT OFFICE.

MYRON A. SMITH, OF NEW YORK, N. Y.

COATING-MACHINE.

No. 901,749.  Specification of Letters Patent.  Patented Oct. 20, 1908.

Application filed August 6, 1903. Serial No. 168,411.

*To all whom it may concern:*

Be it known that I, MYRON A. SMITH, a citizen of the United States of America, and resident of the city, county, and State of New York, have invented certain new and useful Improvements in Coating-Machines, of which the following is a specification.

My invention relates especially to machinery employed by confectioners to apply a coating, such as chocolate, to centers of any kind and shape, and has for its object the provision of a simple and effective machine to accomplish this purpose.

To attain the desired end my invention consists in certain novel and useful combinations or arrangements of parts, and peculiarities of construction and operation, all of which will be hereinafter first fully described, and then pointed out in the claims.
In the accompanying drawings forming a part hereof,
Fig. 2 is a like view of the opposite side.
Fig. 4
25 is a plan view.

Like numerals of reference, wherever they occur, indicate corresponding parts in all the figures.

1 is the main frame wherein is mounted a coating material tank 2, having a surrounding hot water chamber 3.

4 are steam pipes within the chamber 3.

5 is a funnel for supplying chocolate to the tank 2. Centrally located above the coating material tank 2 is a plate 6, heated from below by means of steam pipes 7, and above said plate are fixed two sloping plates 8, heated by means of steam pipes 9; an opening 10 is left between the plates 8, above the horizontal plate 6. Over the sloping plates 8 is a horizontal, perforated plate 11. Carried by sprockets 12 are chains 13 passing over the plate 11, down to the bottom of the tank 2, across the bottom and up the side, said chains carrying buckets 14; this elevating arrangement being substantially the same as that shown and described in Letters Patent No. 708,267 issued to me September 2, 1902 for coating machine.

15 is an air chamber over the material elevating and distributing mechanism provided with heating pipes 16.

17 is a blower for supplying a current of air to the chamber 15.

18 is an outlet conduit from the chamber 15; this conduit terminating in a narrow mouth 19 extending across the machine from side to side.

20 are heating pipes beneath the chamber 15.

21 are sprocket wheels mounted in the main frame and carrying chains 22 bearing carriers for the centers to be coated. Each of these carriers consists of a pair of blocks 23 fixed to corresponding links of the chains 22; each block is connected with a box 24 wherein are movably held two horizontal bars 25 provided with inwardly projecting teeth 26, said bars 25 being normally forced apart by a spring 27. Pivoted at 28 within the box 24 is a lever 29 projecting from the box at 30, the lever being connected by links 31 to each bar 25.

32 are horizontal ribs projecting from the main frame wherewith the ends 30 of the levers 29 are arranged to contact, as will be hereinafter explained.

33 is a sloping feed board divided by partitions 34.

35 is a horizontal plate arranged to slide beneath the delivery end of the feed board; the edge of said plate being provided with teeth 36. Connected to the plate 35 is an arm 37 movably mounted in a bearing 38, and normally moved in one direction by a spring 39.

40 is a friction wheel in the free end of the arm 37 arranged to contact with a cam 41 mounted upon a shaft 42 journaled in the main frame of the machine.

Beneath the extremity of the feed board 33 is a shaft 43 carrying plates 44 provided with arms 45 wherein are pivoted horizontal shelves 46 carrying vertical pins 47, said shelves 46 being always maintained in a horizontal position by means of weights 48.

Pivoted in standards 49 upon the main frame is a yoke 50, from the center of which extends a curved arm 51 arranged to engage with pins 52 in a lantern wheel 53 mounted on a shaft 54 having bearings in the main frame of the machine.

55 are angle plates at each side of the main frame provided with vertical bearings 56 and a pin 57 whereon is coiled a spring 58.

Figures 1, 15:
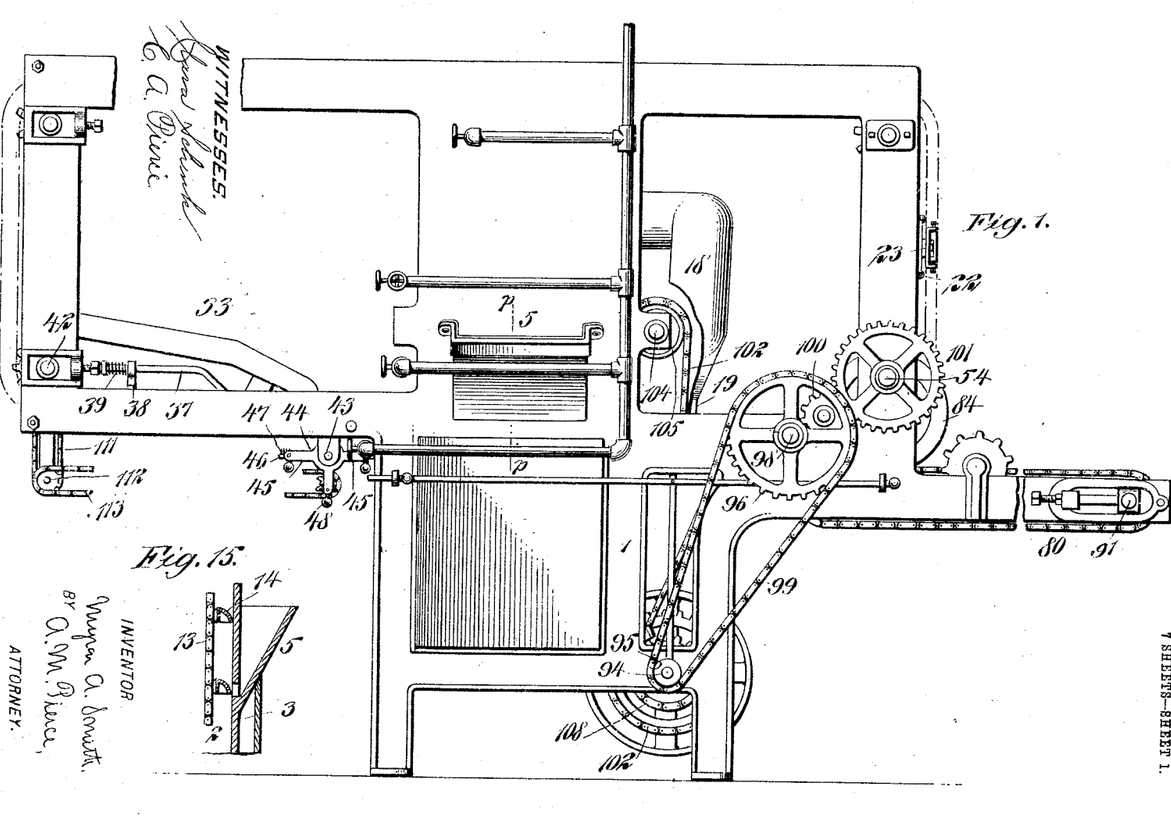
Figure 1 is a side elevation of the machine.
Fig. 15 is a vertical section at line *p—p* of Fig. 1.
Figure 3:
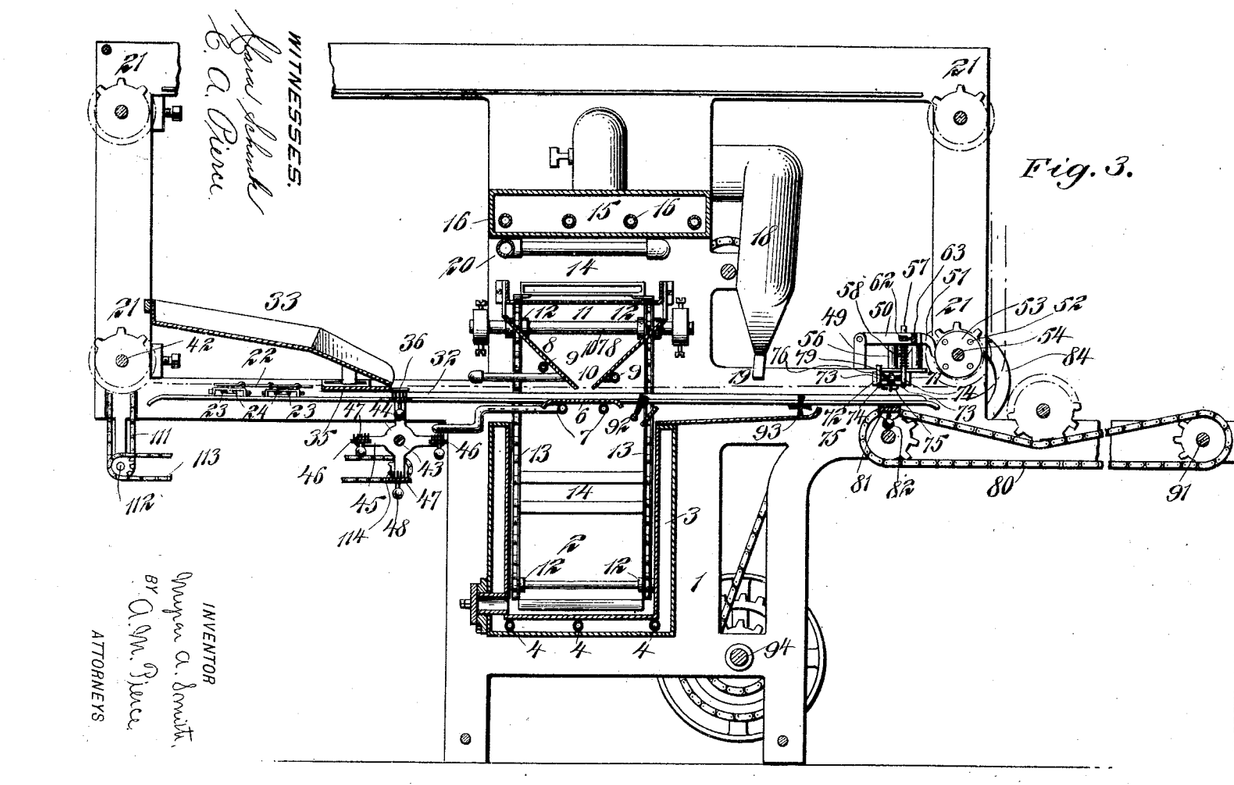
Fig. 3 is a longitudinal, vertical section at line *a—a* of Fig. 4.
Figure 4:
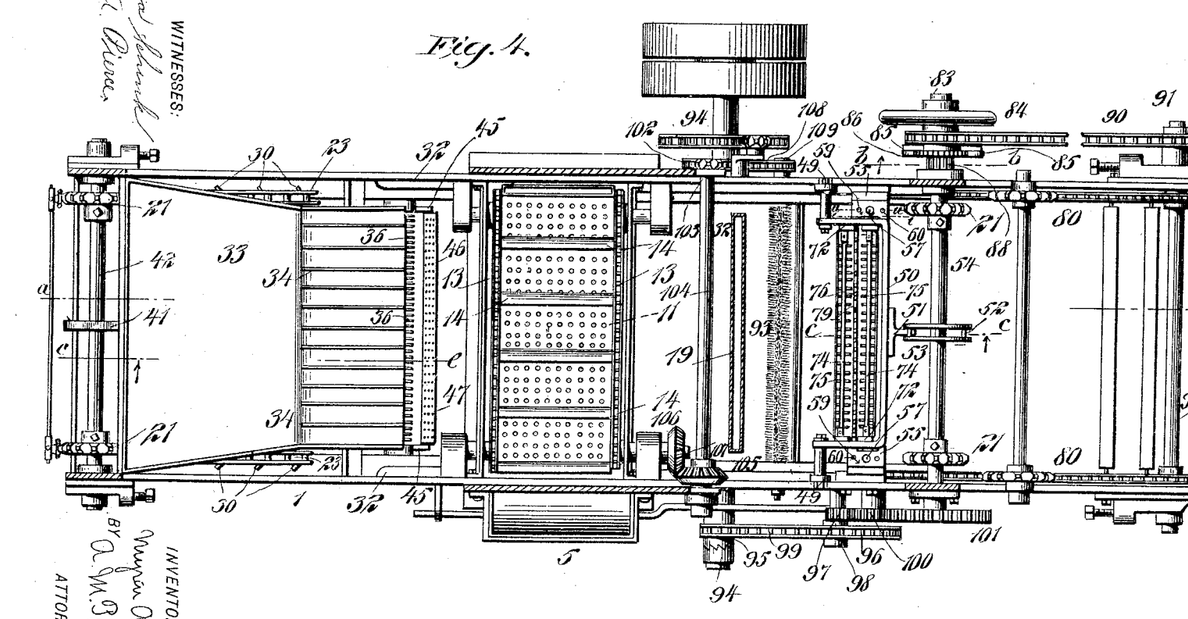
Figure 5:
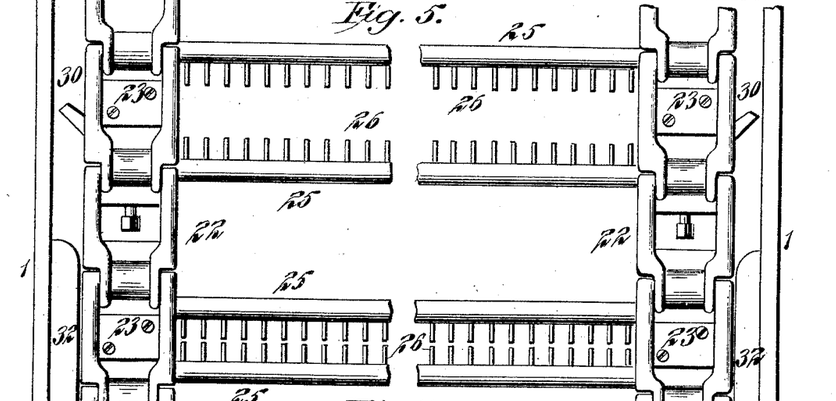
Fig. 5 is an enlarged plan view of a portion of the center carrier.
Figure 6:
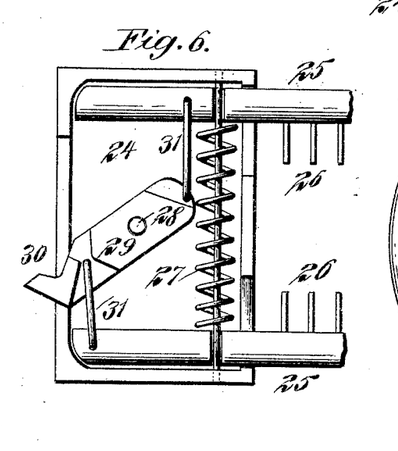
Fig. 6 is an enlarged plan view of the center releasing mechanism forming a part of the center carrier.
Figure 7:
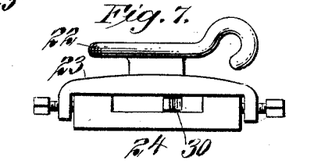
Fig. 7 is a side elevation of
30 the device shown in Fig. 6.
Figures 8, 11:
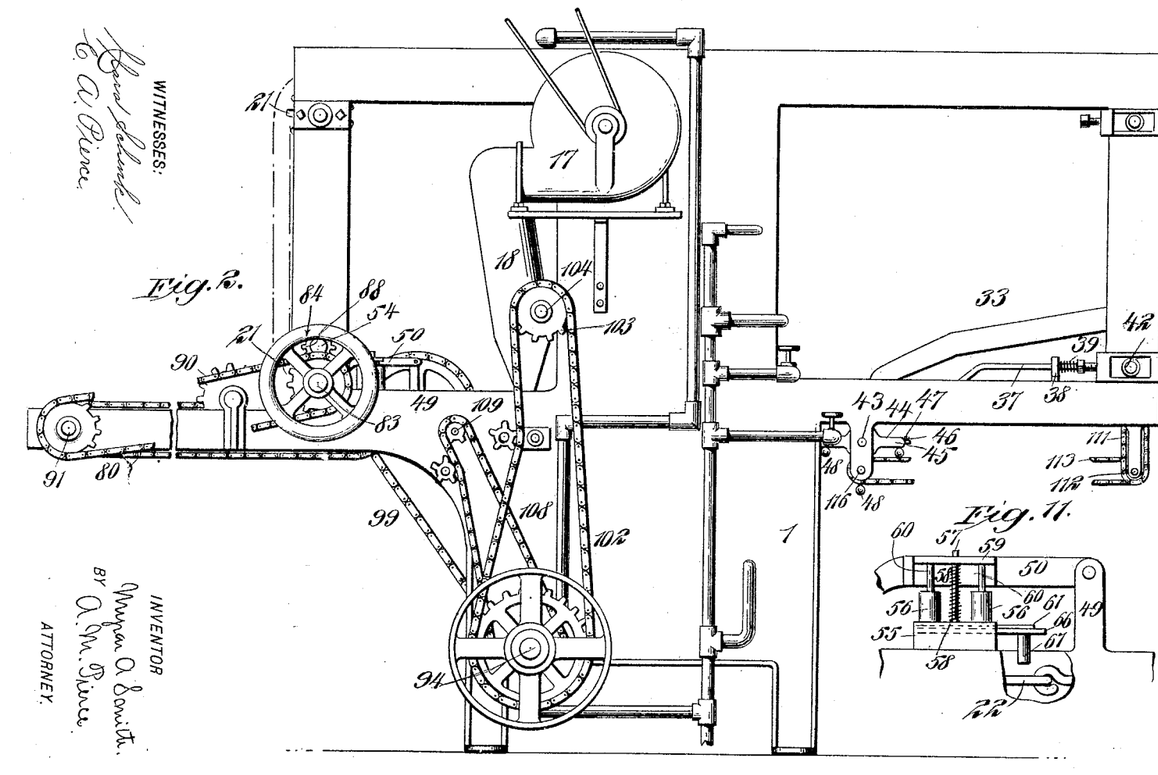
Fig. 8 is an enlarged side elevation of the removing mechanism looking from line *b—b*, Fig. 4.
Fig. 11 is an enlarged detail of a portion of the device employed for transferring the coated goods to the removing mechanism.
Figure 8:
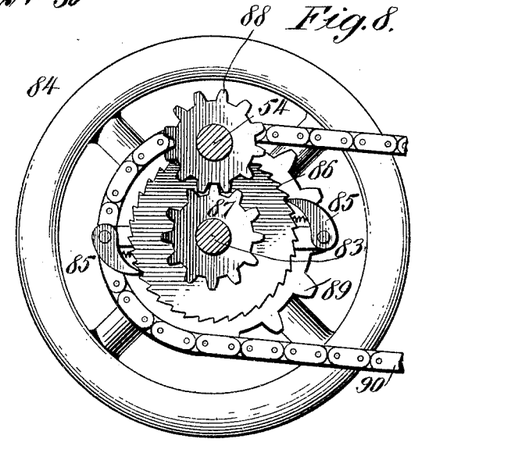
Figure 9:
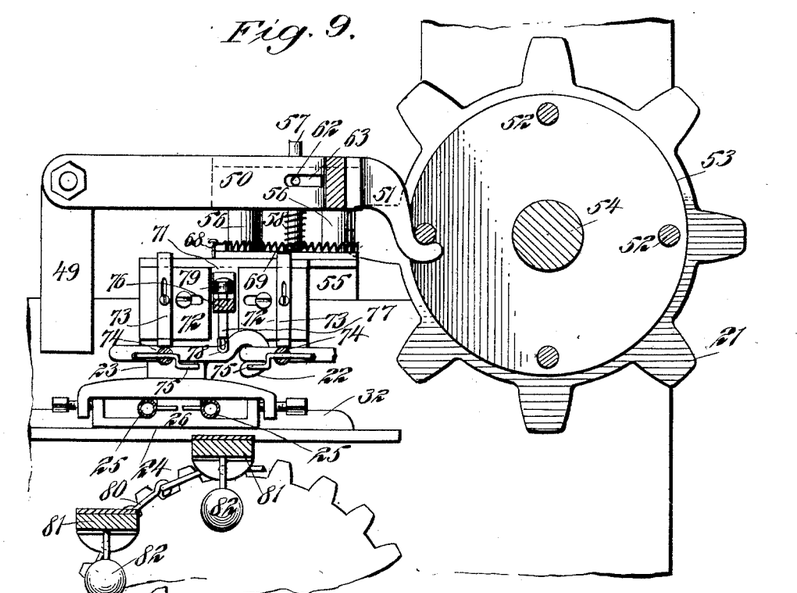
Fig. 9 is an enlarged, detail sectional view at line *c—c* of Fig. 4.
Figure 10:
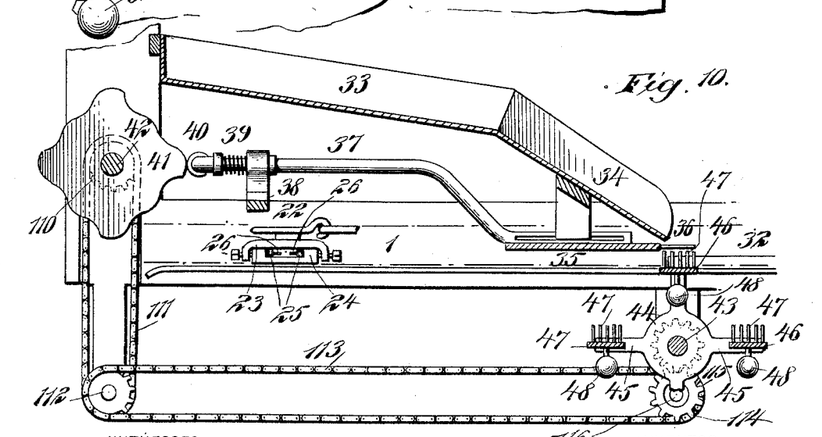
Fig. 10 is a like view at line *e—e* of the same figure.
Figure 12:
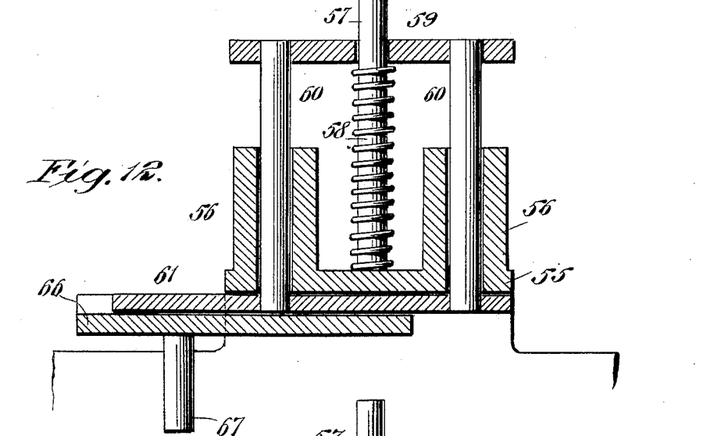
Fig. 12 is an enlarged, vertical sectional view at line *i—i* of Fig. 4.
Figure 13:
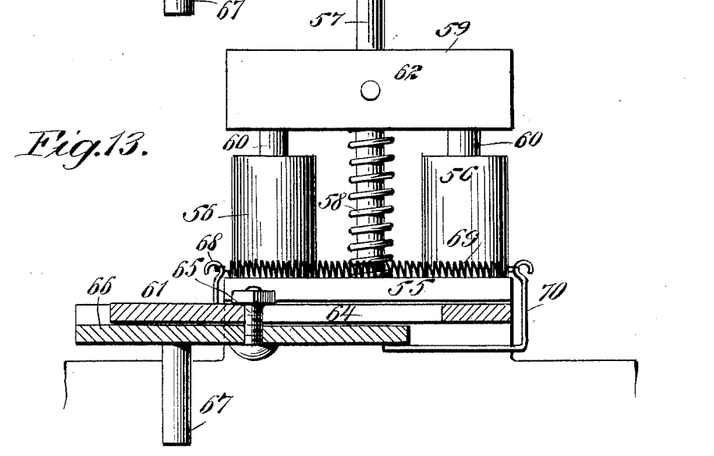
Fig. 13 is a like view at line *u—u* of the same figure.
Figure 14:
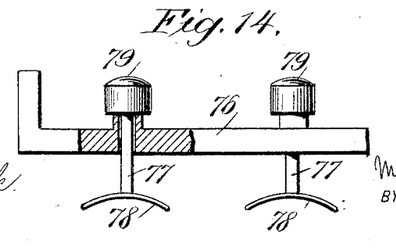
Fig. 14 is an enlarged side elevation of the imprinting mechanism shown in the plan view, Fig. 4.

59 is an angle plate to which are fixed vertical rods 60 bearing at their lower ends a plate 61. The rods 60 are free to move in the bearings 56, the spring 58 normally holding the plate 61 upward. The angle plate 59 bears a stud 62 projecting through a slot 63 in the yoke 50, as particularly shown in Figs. 3 and 9 of the drawing.

The plate 61 is provided with a slot 64 wherein is movably held by a bolt 65 a plate 66 having a downwardly extending lug 67. Secured to an eye 68 in the plate 61 is a spring 69 which passes over the plate 55 and engages with an arm 70 fixed to the plate 66. Plate 66 has a depending apron 71 to which are adjustably held plates 72 bearing adjustable pieces 73 which carry at their lower extremities horizontal bars 74 having projecting fingers 75. By means of the adjustment shown the bars 74 may be adjusted in a vertical and horizontal position in accordance with the shape and size of the centers being coated.

76 is a bar passing across the machine between the two aprons 71. This bar is perforated for the reception of vertically movable pins 77 bearing at their lower extremities any mark as a device 78 it is desired to imprint in or upon the coating material on the goods, and at their upper extremities actuating weights 79.

At the extremity of the machine opposite to the feeding end, and in proximity to the delivering mechanism, is the receiving device which may be carried either horizontally or vertically through any appropriate cooling chamber. This receiving device consists of a pair of chains 80 wherein are pivoted shelves 81 maintained in a vertical position by means of weights 82. The upper surfaces of the shelves 81 are covered with any material to which the coating of the goods will not adhere.

Upon a stud 83 is a hand wheel 84 carrying ratchets 85 engaging with a ratchet wheel 86 connected to a gear 87 the teeth whereof mesh with a gear 88 upon the shaft 54.

89 is a sprocket connected to the wheel 84 and ratchet 85, carrying a chain 90 passing to a sprocket upon a shaft 91, the chains 80 also passing to sprockets upon the same shaft.

92 is a sloping, stationary brush arranged to contact with the bottoms of the coated goods, and 93 is a rotatable brush, both of said brushes acting to remove surplus coating material from the bottoms of the goods.

94 is the main driving shaft provided with a sprocket 95 from which a chain 99 passing to a sprocket 96 connected to a gear 97, both carried by a stud 98.

100 is an intermediate gear meshing with the gear 97 and a gear 101 upon the shaft 54.

102 is a sprocket chain driven by the main shaft 94 passing to a sprocket 103 upon a shaft 104 carrying a miter gear 105 meshing with a corresponding gear 106 upon one of the shafts 107 of the coating material elevating device.

108 is a chain passing from the main driving shaft 94 to the shaft 109 of the rotary brush 93. Upon the shaft 42 at the front of the machine is a sprocket 110 from which a chain 111 passes to a sprocket upon a stud 112, a second sprocket upon said stud, connected to the first mentioned sprocket, driving a chain 113 passing to a sprocket 114 connected to a gear 115 upon a stud 116, said gear meshing with a gear upon the reel shaft 43.

When constructed and arranged in accordance with the foregoing description, the operation of my coating machine is as follows: The centers to be coated are placed upon the feed board and pass down between the partitions 34, the lowermost centers in each row resting upon the pins or teeth 36. The shelves 46 bearing the pins 47 are spaced, and move in unison with the coating carriers, and as a carrier passes beneath the feeding device, a shelf 46 rises beneath it, the pins 47 passing between the fingers of the carrier, the carrier and shelf moving forward in unison beneath the teeth 36, when the same are momentarily withdrawn, leaving the centers to be coated resting upon the pins 47; the continued movement of the shelf drops the pins away from the carrier, leaving the centers resting thereon. In the mean time the teeth 36 have returned to their initial position, a row of centers rests thereon, and another shelf 46 and coating carrier passes beneath them. The said carrier now passes over the plate 6, beneath the sloping plates 8, and as the coating material is passing down said plates and between them, the centers are completely covered; the top by the directly falling material; the sides by the flow thrown against them at an angle by the sloping plates, and the bottoms by passing over the material upon the plate 6. When the row of goods passes over the brush 92 surplus material is removed from their bottoms, and the tops are then subjected to a blast of hot air from the mouth 19 of the conduit 18, this blast of air removing surplus coating material, and at the same time breaking any bubbles, and flattening any inequalities, leaving the tops and sides of the coated goods smooth and uniform.

Any surplus coating material hanging from the bottom after leaving the air blast is removed by the rotary brush 93. As the carriers reach the removing device, the yoke 50 is depressed by the action of the lantern wheel 53, the pin 67 passing into a link of the chain 22, which causes the plates 66 carrying the rods 74 to move forward with the chain and carrier at the same time the yoke is depressing said rods, causing them to pass to each side of the row of coated goods preventing displacement of the same as the carrier bars 25 are allowed to spread apart, withdrawing the teeth 26 from beneath the coated goods, through the medium of the release of the projections 30 from contact with the ribs 32. As this movement takes place, the yoke 50 is released, and instantly elevated through the medium of the springs 58; the springs 69 returning the plate 66 carrying the bars 74 to their initial position, and the movements of the parts withdrawing the pins 67 from the chain 22. As these movements take place, one of the receiving shelves 81 has been presented beneath the coated goods ready to receive them, and such operation is continued while the machine is running.

Chocolate or the equivalent, is supplied in a semi-plastic condition to the funnel 5, a portion being carried down into the tank 2 by each descending bucket 14.

As it may be desirable to move the goods to the delivery end of the machine after they are cooled, and while several rows are still upon the shelves 81, by turning the hand wheel 84 the chains 80 carrying the shelves 81 are rapidly and easily moved the requisite distance.

Having now fully described my invention, what I claim is new therein, and desire to secure by Letters Patent, is:

1. A coating machine in which is comprised a device for automatically feeding a single row of centers to be coated to a holder consisting of two automatically movable members; a series of said holders carried by endless chains; means for directing and applying coating material to the centers; a device adapted to assist in removing the coated centers from the carriers; a series of receivers for the coated goods, and means for moving all of said parts in unison, substantially as shown and described.

2. A coating machine in which is comprised a device for automatically feeding a single row of centers to be coated to a holder consisting of two automatically movable members; a series of said holders carried by endless chains; means for directing and applying coating material to the centers; means for removing the surplus coating material from the centers; a device adapted to assist in removing the coated goods from the carriers, and a series of receivers for the coated goods, the whole combined and arranged to operate substantially as shown and described.

3. In a coating machine, a feeding device in which is comprised a sloping feed board; a movable center support beneath the delivery end of the feed board; means for reciprocating said support; a rotatable reel carrying receiving shelves or plates, and means for rotating said reel, in combination with a series of center carriers and means for moving the same.

4. In a coating machine, a sloping feed board; a movable center support consisting of teeth projecting from a plate beneath the delivery end of the feed board; means for reciprocating said plate; a reel carrying pivoted shelves provided with means for maintaining the shelves in a horizontal position, teeth projecting from the upper surfaces of said shelves, in combination with a series of center carriers, and means for moving the reel and center carriers in unison, substantially as shown and described.

5. In a coating machine, the combination with a coating material tank, a perforated distributer mounted thereabove, and means for elevating and spreading coating material over said distributer, of sloping directing plates beneath the distributer, substantially as shown and described.

6. In a coating machine, the combination with a coating material tank, a perforated distributer mounted thereabove, and means for elevating and spreading coating material over the distributer, of sloping directing plates beneath the distributer, and a horizontal plate over the material tank, below the directing plates, substantially as shown and described.

7. In a coating machine, the combination with a coating material tank, a horizontal plate fixed thereover, and sloping directing plates above the horizontal plate, of means for supplying coating material to the directing plates.

8. In a coating machine, the combination with a coating material tank, of a horizontal plate fixed thereover, sloping directing plates, above the horizontal plate; means for supplying coating material to the directing plates, and means for moving centers to be coated over the horizontal plate and beneath the directing plates, substantially as shown and described.

9. In a coating machine, the combination with carrying chains, of center holders in which are comprised two horizontal, separable center supporting members, means for automatically separating said members, and means for holding said members in a closed position.

10. A center carrying support in which is comprised two horizontal movable members, in combination with means for spreading said members apart, or holding them in a closed position.

11. A center carrying support in which is comprised two horizontal members, movably held at each extremity within a carrying and guiding box; a spring for normally holding the two members apart, and means for drawing said members together.

12. In a coating machine, the combination with a yoke carrying mechanism adapted to assist in removing the coated centers from their supports, of an arm extending from said yoke, and means for depressing said arm and yoke, substantially as shown and described.

13. In a coating machine, a directing device adapted to assist in removing the coated centers from their supports in which is comprised two bars or rods having an opening between them, in combination with means for moving said bars in a simultaneously downward and forward direction in unison with the movement of the carrier for the coated centers, and means for automatically returning the directing device to its initial position.

14. In a coating machine, the combination with carriers for the centers to be coated, of a directing device adapted to assist in removing the coated centers from the coating carriers in which is comprised two bars or rods having an opening between them; means for moving said bars in a simultaneously downward and forward direction in unison with the movement of the coating carrier; means for automatically returning the directing device to its initial position, and a movable receiver for the coated goods.

15. In a coating machine, a carrier for the completely coated goods, in combination with a directing device adapted to assist in placing said goods upon said carrier, and means for moving the directing device in unison with said carrier.

16. In a coating machine, a coating carrier for the centers, in combination with a directing device adapted to assist in removing the coated goods, and means for moving the directing device in unison with the said carrier.

17. In a coating machine, a carrier for coating the centers a directing device adapted to assist in removing the coated goods from said carrier; means for moving the directing device in unison with said carrier, and a receiver for the goods, the whole combined and arranged to operate substantially as shown and described.

18. In a coating machine, the combination with a directing device of the character herein specified, of means carried by said directing device for applying an imprint to each coated center, substantially as shown and described.

19. In a coating machine, the combination with the carrier for the coated goods, of a vertically and horizontally movable imprinting device.

20. In a coating machine, a directing device adapted to assist in removing the coated goods in which is comprised two bars or rods having an opening between them, in combination with means for moving said bars in a simultaneously downward and forward direction in unison with the movement of the carrier for the coated centers, and means for applying an imprint to each coated center, substantially as shown and described.

21. In a coating machine, the combination with delivering mechanism for the coated goods, of a receiving device in which is comprised a series of self-righting shelves, and means for moving the delivering and receiving devices in unison, substantially as shown and described.

22. The combination with the carrier for the completely coated goods, of the driving sprocket connected to a hand wheel provided with ratchets to engage a ratchet wheel connected to the driving gear, substantially as and for the uses and purposes shown and described.

23. In a coating machine, a horizontal plate; means for supplying coating material thereto, and a carrier for goods to be coated, in combination with a rotatable brush for removing surplus coating material from coated goods.

24. In a coating machine, the combination with the delivering mechanism for the coated goods, of a receiving device in which is comprised a series of movable, self-righting shelves.

25. In a coating machine, the combination with a coating material tank, a material receiving device thereover, and means for supplying material to the receiving device, of converging directing plates below the receiving device and a carrier for goods to be coated arranged to pass below the opening between said plates.

26. In a coating machine, the combination with a coating material tank, a material receiving device located thereover, and means for supplying material to the receiving device, of converging directing plates located below the receiving device, a carrier for goods to be coated, and means, located below the opening between the converging plates, for applying coating material to the bottoms of the goods.

27. In a machine of the character herein specified, a carrier for centers to be coated in which is comprised a series of horizontally movable supporting fingers whereon the centers are held by gravity, in combination with means for removing the coated goods from said fingers, and a receiver for said goods.

28. In a candy coating machine, the combination of an endless carrier mounted to present upper and lower stretches movable in opposite directions, a series of holders for supporting from beneath articles to be coated said holders being mounted on said carrier, means for applying a coating material to the articles during the movement of the holders in one direction, and means for receiving the coated articles from the holders near the end of the movement of the latter in the same direction.

29. In a candy coating machine, the combination with an endless carrier mounted to present upper and lower stretches movable in opposite directions, a series of holders for supporting articles to be coated said holders being mounted on said carrier, means for applying a coating material to the articles during the movement of the holders in one direction, and means for receiving the coated articles from the holders near the end of the movement of the latter in the same direction, said receiving means being movable in the same direction as the holders from which the coated articles are being delivered.

30. In a candy coating machine, the combination of a series of holders for articles to be coated, each of said holders having an extended substantially continuous openwork surface adapted to support simultaneously from beneath several of the articles to be coated irrespective of their shapes, means for applying a coating material to the articles on said holders, means for moving said holders past the coating means, and means for moving the said holders out of their supporting positions to deliver the coated articles therefrom.

31. In a candy coating machine, the combination of a series of holders for articles to be coated, each of said holders having supporting means extending transversely of the carrier and adapted to support the articles to be coated irrespective of their shapes, means for applying a coating material to the articles on said holders, means for moving said holders along part of an orbital path to receive the articles to be coated and carry them past the coating means without substantially varying their coating positions, and means for moving said holders out of their supporting positions at a certain point in their path to deliver the coated articles.

Signed by me at New York city, this 1st day of August, 1903.

MYRON A. SMITH.

Witnesses:
A. M. PIERCE,
CLARA SCHENK.